(12) United States Patent
Murakami

(10) Patent No.: US 8,072,420 B2
(45) Date of Patent: Dec. 6, 2011

(54) INPUT DEVICE EQUIPPED WITH ILLUMINATION MECHANISM

(75) Inventor: Takahiro Murakami, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1042 days.

(21) Appl. No.: 11/946,239

(22) Filed: Nov. 28, 2007

(65) Prior Publication Data

US 2008/0129701 A1 Jun. 5, 2008

(30) Foreign Application Priority Data

Dec. 1, 2006 (JP) .................. 2006-325621

(51) Int. Cl.
*G09G 5/00* (2006.01)
*G06F 3/041* (2006.01)
*H01H 9/00* (2006.01)

(52) U.S. Cl. ......... 345/156; 345/170; 345/173; 200/314

(58) Field of Classification Search .................. 345/173; 200/310–317
See application file for complete search history.

(56) References Cited

U.S. PATENT DOCUMENTS

| 6,137,459 | A * | 10/2000 | Eida et al. .................. 345/76 |
| 7,382,360 | B2 * | 6/2008 | Mackey et al. ............... 345/173 |
| 7,432,464 | B2 * | 10/2008 | Chiu et al. ................... 200/310 |
| 2002/0145593 | A1 * | 10/2002 | Boyd et al. .................. 345/173 |
| 2003/0052867 | A1 * | 3/2003 | Shigetaka et al. ............ 345/173 |
| 2006/0262072 | A1 * | 11/2006 | Murakami et al. ........... 345/100 |
| 2008/0073186 | A1 * | 3/2008 | Kenmochi .................... 200/5 A |

FOREIGN PATENT DOCUMENTS

JP 2006-107307 4/2006

* cited by examiner

*Primary Examiner* — Bipin Shalwala
*Assistant Examiner* — Benyam Ketema
(74) *Attorney, Agent, or Firm* — Brinks Hofer Gilson & Lione

(57) ABSTRACT

A light guide member and a sensor that constitute a front light mechanism are bonded with a bonded sheet. A double-sided adhesive tape is provided on each surface of the bonded sheet. A repairing material is printed on a surface of the sensor so as to fill concave portions provided between the adjacent X-electrodes. This substantially increases the contact area with the double-sided adhesive tape, and increases the bonding strength between the light guide member and the sensor.

11 Claims, 6 Drawing Sheets

INPUT DEVICE EQUIPPED WITH ILLUMINATION MECHANISM

CLAIM OF PRIORITY

This application claims benefit of the Japanese Patent Application No. 2006-325621 filed on Dec. 1, 2006, the entire content of which is hereby incorporated by reference.

BACKGROUND OF THE INVENTION

1. Field of the Invention

The present invention relates to input devices that allows coordinate input and switch input through an operation surface, and more particularly, to an input device equipped with an illumination mechanism that illuminates an operation surface.

2. Description of the Related Art

Conventionally, a coordinate input device called a touch pad is mounted in a mobile computer terminal device such as a notebook personal computer. The touch pad is a pointing device for operating a cursor or a pointer displayed on the screen of the terminal device, similarly to a mouse. When a user's finger or a pen tip (pointing member) touches an operation surface of the touch pad, the touch point is detected by a sensor, and the cursor or the pointer is operated in accordance with a coordinate value of the touch point or the displacement of the coordinate value by movement of the touch point.

Japanese Unexamined Patent Application Publication No. 2006-107307 discloses a coordinate input device in which an operation surface is illuminated by an LCD panel (light guide plate) with a front light provided on a sensor.

In this input device, however, a reflection plate is provided on the sensor, and a light guide plate having a prism surface is provided on the reflection plate. Although the sensor, the reflection plate, and the light guide plate are combined by being fixed at both ends by a fixing frame, particularly, the fixing strength between the reflection plate and the light guide plate is apt to be insufficient.

In order to solve this problem, it is conceivable to increase the mechanical strength by entirely joining an upper surface of the reflection plate and a bottom surface of the light guide plate with an adhesive such as a double-sided adhesive tape.

Unfortunately, the bottom surface of the light guide plate is formed by a prism surface having fine irregularities. If the prism surface is buried in the adhesive, it does not fulfill its function, that is, a light reflecting function. Further, since light leaks from the joint portion, the light guide efficiency decreases, and luminance on an illuminating surface (principal surface of the light guide plate) easily becomes nonuniform.

When the reflection plate and the light guide plate are simply fixed with the adhesive, an air layer is sealed between the prism surface and the reflection plate. For this reason, if the temperature changes, the air pressure in the air layer increases or decreases. When this stress is repeatedly caused, the joint portion is deteriorated.

Multiple electrodes are provided on a surface of a substrate that forms the sensor, and the surface of the sensor has irregularities formed by the electrodes and the substrate surface. For this reason, a space is easily formed between the upper surface of the sensor and the lower surface of the reflection plate, and the joint therebetween is apt to be insufficient.

While an LED covered with a case is disposed adjacent to an end face of the light guide plate so as to face the end face, the efficiency in guiding light emitted from the LED into the light guide plate is low.

Further, in this input device, marks are not optically displayed on the operation surface, and it is difficult to visually recognize an operation mode and an object to be operated.

SUMMARY

An input device according to an embodiment includes a sensor configured to detect an input operation performed on an operation surface; a front light mechanism provided on the sensor and configured to illuminate the operation surface; a mode switching unit configured to select a predetermined operation mode in accordance with the input operation on the operation surface; and a control unit configured to switch an illuminating operation of the front light mechanism under the control of the mode switching unit.

In this case, since the illuminating operation of the front light mechanism is switched in accordance with the selected operation mode, the operation mode can be visually recognized, and operability is enhanced.

An input device according to another aspect includes a sensor configured to detect an input operation performed on an operation surface; and a front light mechanism provided on the sensor and configured to illuminate the operation surface. A predetermined mark is optically displayed on the operation surface.

In this case, since various marks are optically displayed on the operation surface of the front light mechanism, operability can be enhanced.

DESCRIPTION OF THE EMBODIMENTS

Figure 1:
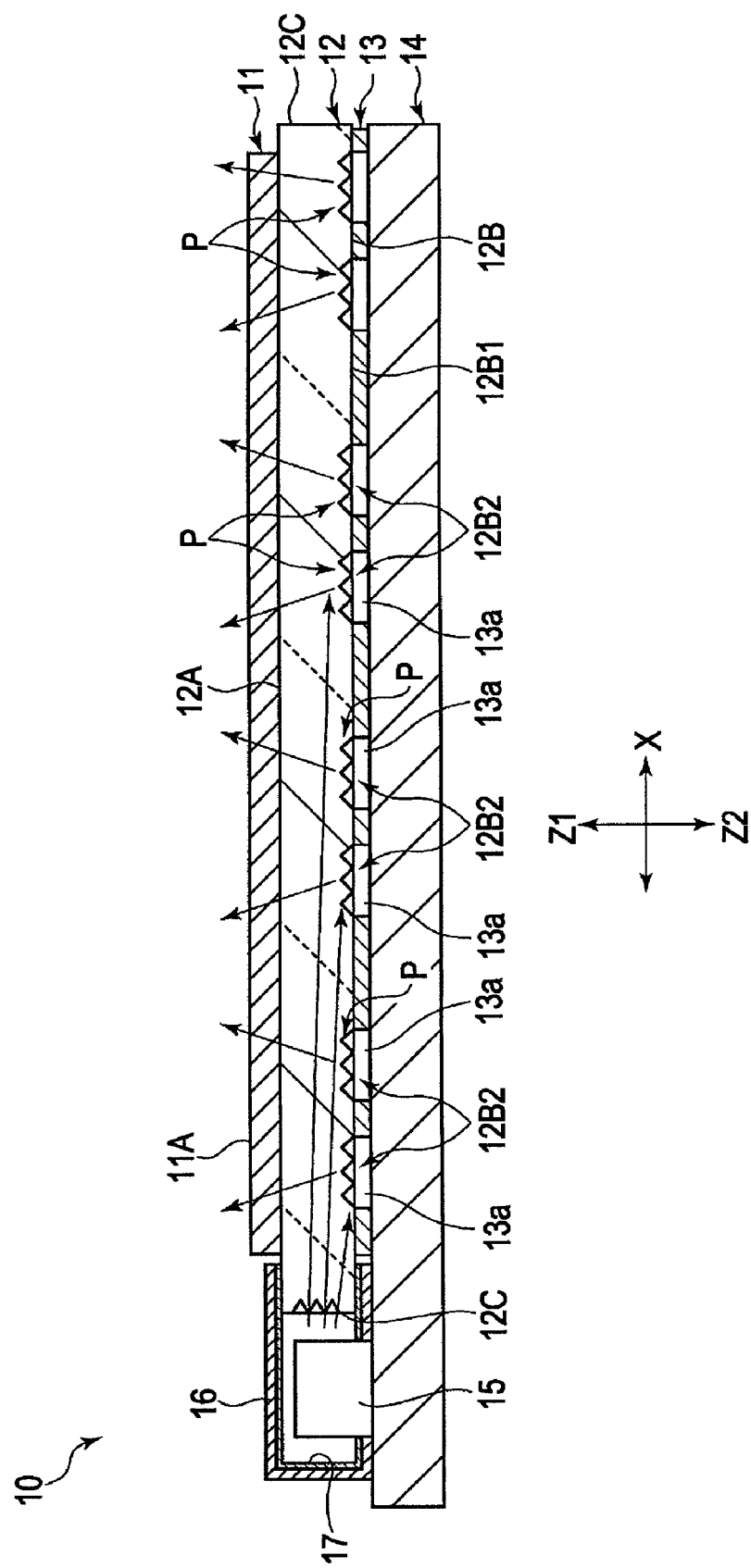
FIG. 1 is a cross-sectional view conceptually showing a configuration of an input device equipped with an illumination mechanism according to an embodiment.
Figure 2:
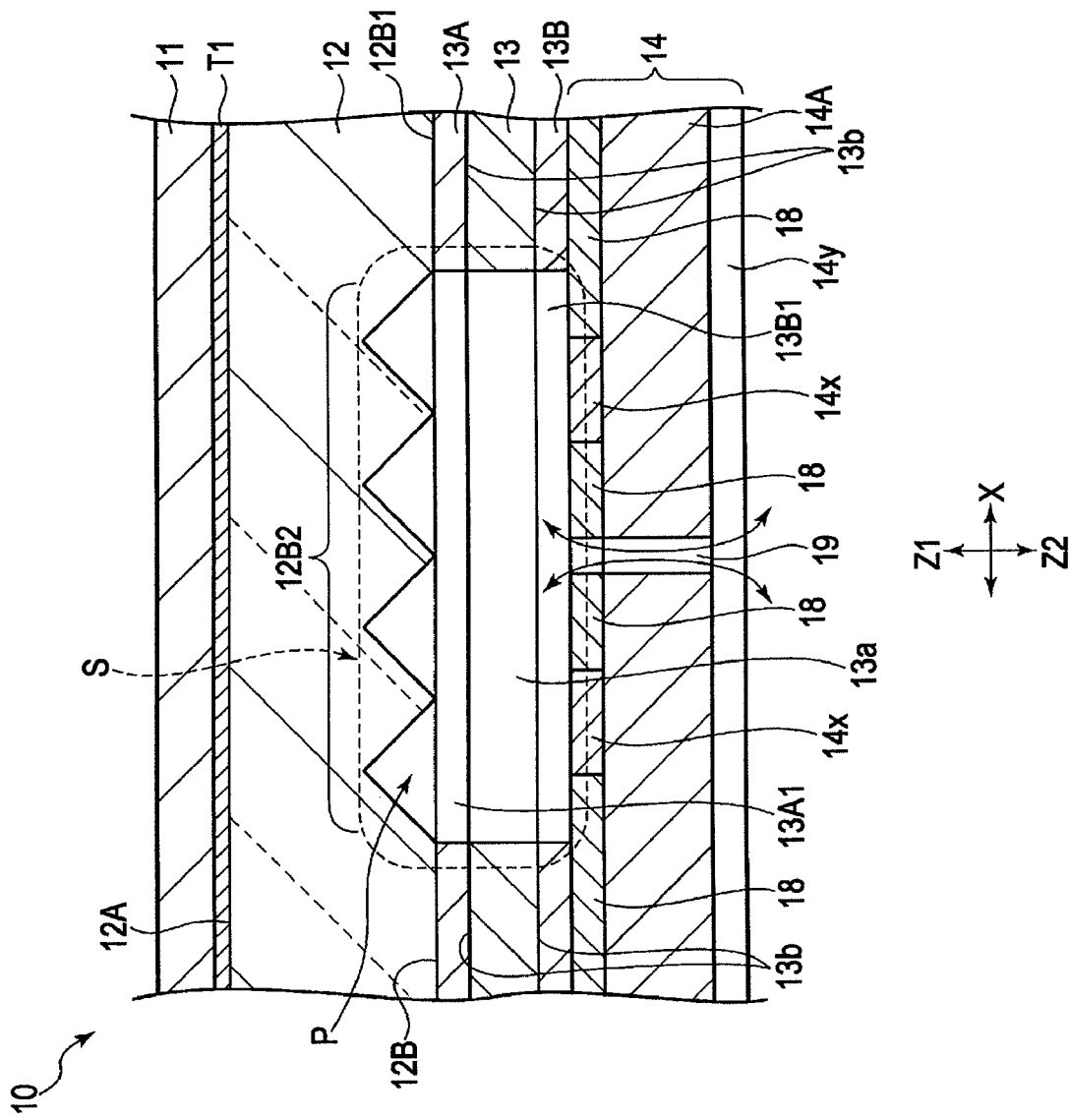
FIG. 2 is an enlarged partial cross-sectional view of the input device shown in FIG. 1.
Figure 3A:
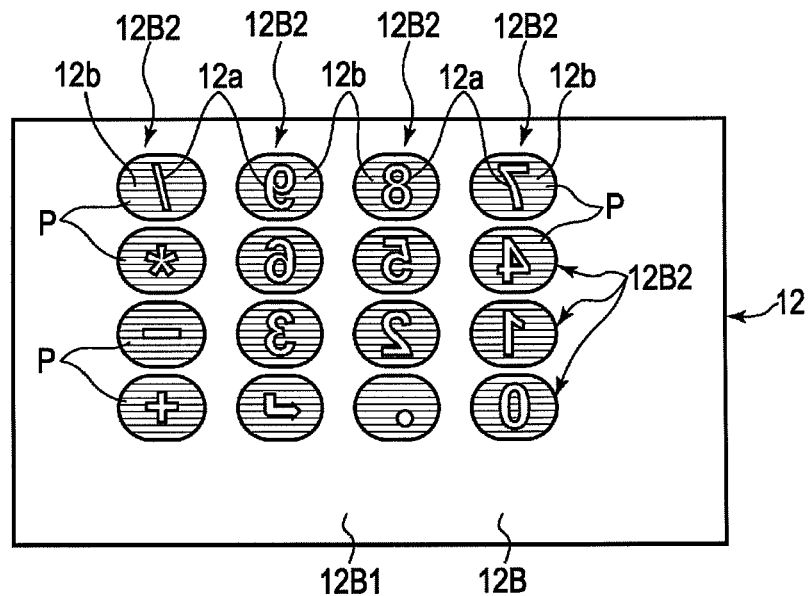
FIG. 3A is a bottom view of an example of a light guide member.
Figure 3B:
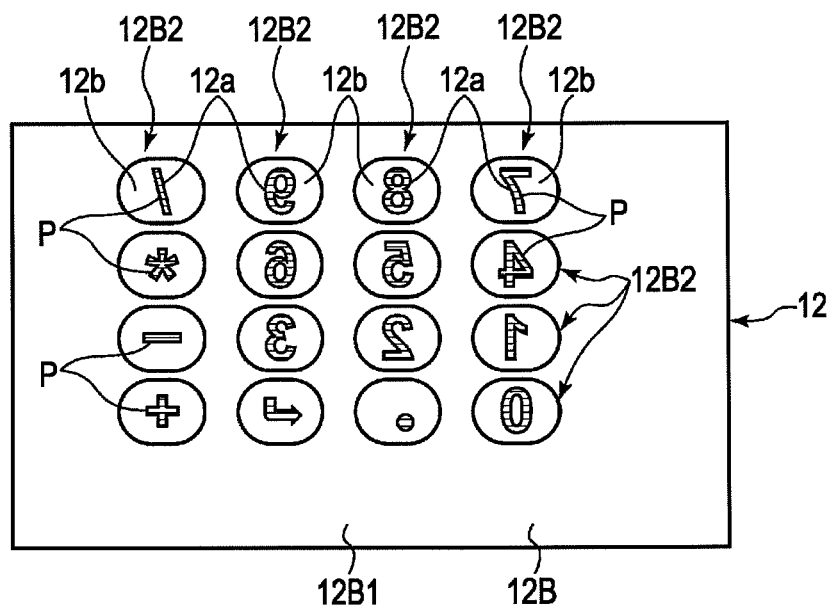
FIG. 3B is a bottom view of another example of a light guide member.
Figure 4A:
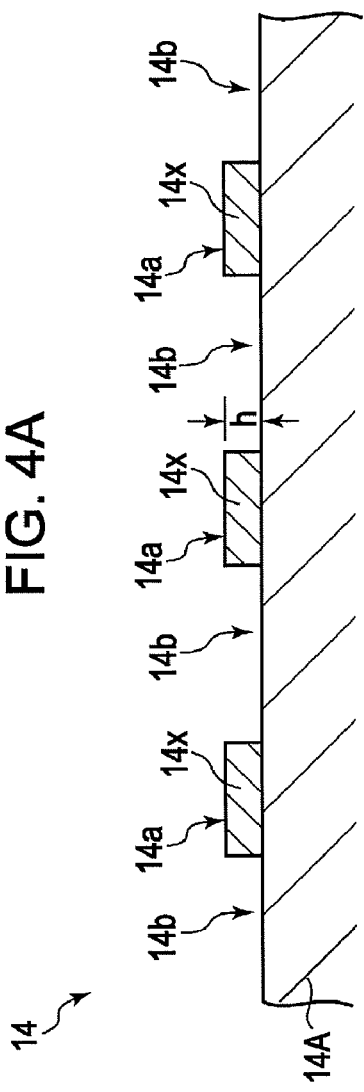
FIGS. 4A and 4B are enlarged partial cross-sectional views of a surface of a sensor, respectively, showing a state before repair and a state after repair.
Figure 4B:
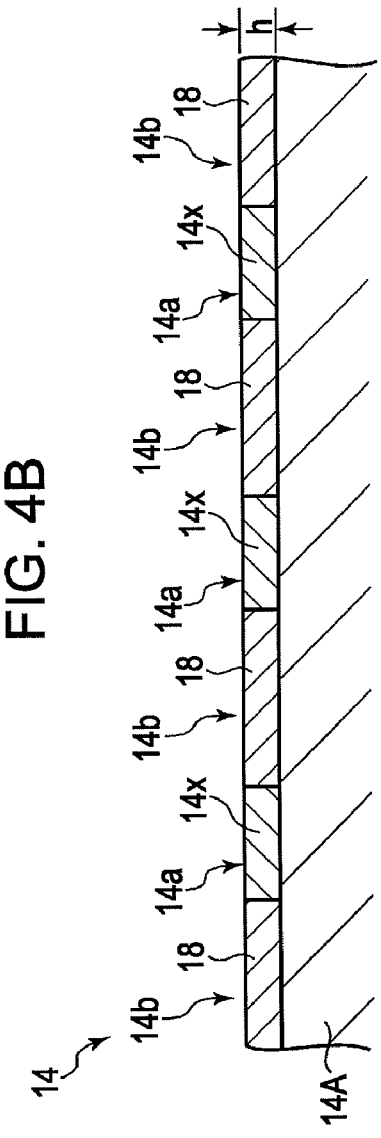

FIG. 1 is a cross-sectional view conceptually showing a configuration of an input device equipped with an illumination mechanism according to an embodiment, FIG. 2 is an enlarged partial cross-sectional view of the input device shown in FIG. 1, FIG. 3A is a bottom view of an example of a light guide member, FIG. 3B is a bottom view of another example of a light guide member, and FIGS. 4A and 4B are enlarged partial cross-sectional views of a surface of a sensor, respectively, showing a state before repair and a state after repair.

An input device 10 according to an embodiment is mounted in, for example, a main body of a computer (hereinafter referred to as a PC body), and is a glide point (GP) serving as a kind of pointing device (PD) that detects various inputs from the operator and converts the inputs into signals.

As shown in FIG. 1, the input device 10 has a multilayer structure in which a plurality of materials are stacked in a thickness direction (Z-direction). A top sheet 11 is provided as the uppermost layer of the input device 10. Under the top sheet 11, a light guide member 12, a bonded sheet 13, and a sensor 14 are stacked in that order from the top.

A surface of the top sheet 11 serves as an operation surface 11A to be directly touched by the operator's finger (pointing member). For example, the operation surface 11A is satin-finished to have fine irregularities. The fine irregularities can improve operability, and also serve as light-diffusing portions that diffuse external light so as to prevent reflection by the operation surface 11A.

The light guide member 12 is formed of a resin material having a high light transmittance, such as polycarbonate or acrylic, or a transparent glass material. Referring to FIGS. 1 and 2, an upper surface of the light guide member 12 serves as an illuminating surface 12A that outputs light upward (in the Z1-direction). The light guide member 12 also has a bottom surface 12B on the Z2-side, and end faces 12C provided at both ends in the width direction (X-direction).

A lower surface of the top sheet 11 is firmly joined to the illuminating surface 12A, for example, with a double-sided adhesive tape T1. Since both the illuminating surface 12A of the light guide member 12 and the lower surface of the top sheet 11 are flat, the mechanical strength of the joint therebetween is sufficient, and is rarely influenced by stress.

The bottom surface 12B is basically formed by a flat surface 12B1, and a plurality of optical regions 12B2 (16 regions in FIGS. 3A and 3B) are provided on the flat surface 12B1. As shown in FIGS. 3A and 3B, a mark 12a, such as a figure, a character, or a sign, is provided in each of the optical regions 12B2.

In an example shown in FIG. 3A, a mark 12a is formed at the center of an optical region 12B2 by a part of the flat surface 12B1. A peripheral portion 12b of the optical region 12B2 other than the mark 12a is formed by a prism face P (see FIG. 2) including substantially triangular fine irregularities.

An example shown in FIG. 3B has an inverse relation with the example shown in FIG. 3A. That is, a portion inside a mark 12a provided at the center of the optical region 12B2 is formed by a prism face P having substantially triangular fine irregularities, and a peripheral portion 12b is formed by a flat face similar to the flat surface 12B1. The prism face P, that is, the fine irregularities can be formed, for example, by subjecting the light guide member 12 to injection molding or to laser beam machining.

As shown in FIG. 1, an LED 15 serving as a light source is provided beside the light guide member 12, and faces the end face 12C of the light guide member 12. The LED 15 is covered with a case 16 of C-shaped cross section. In order to achieve a simpler structure and space saving, it is preferable to place the LED 15 on a base material 14A of the sensor 14 that will be described below, as shown in FIG. 1.

The input device 10 is electrically connected to a PC body 2 and a controller 3 that will be described below. The controller 3 is electrically connected to the LED 15 so as to exert various control operations, such as ON/OFF control, on the LED 15.

An inner surface of the case 16 is formed by a mirror finished surface 17. Most light emitted from the lighted LED 15 under the control of the controller 3 is reflected by the mirror finished surface 17, and is guided into the light guide member 12 via the end face 12C. For example, the mirror finished surface 17 can be formed by bonding a high-reflectance material, such as aluminum, on the inner surface of the case 16. In this embodiment, a plurality of LEDs 15 are provided such as to face the end face 12C of the light guide member 12.

Light emitted from each LED 15 propagates in the light guide member 12, and is reflected by the prism face P provided in the optical region 12B2. The prism face P serves to control the traveling direction of light guided through the light guide member 12 and to direct the light toward the illuminating surface 12A (in the Z1-direction).

For this reason, the light is emitted in the Z1-direction from the illuminating surface 12A to the top sheet 11. In this case, a portion of the surface of the illuminating surface 12A corresponding to the prism face P is illuminated more brightly than other portions corresponding to the flat surface 12B1. That is, the top sheet 11, the light guide member 12, the bonded sheet 13, and the LED 15 serving as a light source constitute a front light mechanism.

Therefore, in the example shown in FIG. 3A, the peripheral portion 12b in which the prism face P is provided is displayed more brightly than the mark 12a. Conversely, in the example shown in FIG. 3B, the center mark 12a in which the prism face P is provided is displayed more brightly than the peripheral portion 12b.

In any example, since the contrast between the mark 12a and the peripheral portion 12b becomes high, the mark 12a can be clearly viewed on the operation surface 11A of the top sheet 11 from above.

A mark corresponding to the mark 12a may be printed on the lower surface of the top sheet 11. In this case, the mark 12a can be more clearly viewed on the operation surface 11A from above.

As shown in FIG. 1, the bonded sheet 13 is provided between the light guide member 12 and the sensor 14. The bonded sheet 13 is formed of synthetic resin such as PET, and has a black surface.

In the front light mechanism according to this embodiment, a reflection plate is unnecessary because light incident on the light guide member 12 is directly emitted by the prism face P. If a reflection plate is provided, it reflects external light, and the light from the LED 15 is difficult to see. For this reason, it is preferable that the bonded sheet 13 be black.

As shown in FIG. 2, a plurality of apertures 13a are provided in the bonded sheet 13 corresponding to the optical regions 12B2. Portions of upper and lower surfaces of the bonded sheet 13 other than the apertures 13a serve as bonding faces 13b.

A double-sided adhesive tape 13A is provided on the upper surface of the bonded sheet 13. Similarly, a double-sided adhesive tape 13A is provided on the lower surface of the bonded sheet 13. The double-sided adhesive tapes 13A and 13B have the same flat shape as that of the bonded sheet 13, and include openings 13A1 and 13B1 having a flat shape similar to that of the above-described apertures 13a. For this reason, the openings 13A1 of the double-sided adhesive tape 13A oppose the apertures 13a of the bonded sheet 13, and the double-sided adhesive tape 13A is bonded only to the bonding face 13b. Therefore, the flat surface 12B1 of the light guide member 12 and the upper bonding face 13b of the bonded sheet 13 can be fixed firmly, and the prism faces P in the optical regions 12B2 of the light guide member 12 will not be buried in the double-sided adhesive tape 13A.

Similarly, the lower bonding face 13b of the bonded sheet 13 and the surface of the sensor 14 can be fixed with the double-sided adhesive tape 13B.

The sensor 14 includes a plurality of X-electrodes 14x extending in the longitudinal direction on one upper surface of the base material 14A, and a plurality of Y-electrodes 14y extending in the lateral direction on the other lower surface. The X-electrodes 14x and the Y-electrodes 14y are arranged in a matrix. An electrostatic capacity is provided between each X-electrode 14x and the corresponding Y-electrode 14y.

When the operator's finger (pointing member) touches the operation surface 11A of the input device 10 including the sensor 14 having the above-described structure, an electrostatic capacity corresponding to the touch position in the sensor 14 decreases. This change in electrostatic capacity is converted into a change in voltage, and is sampled as the amounts of change at the electrodes. The positions (coordinate values) of the finger in the X-direction and Y-direction are detected on the basis of the amounts of change at the electrodes.

As shown FIG. 4A, the X-electrodes 14x provided on the surface of the base material 14A are formed by thin films having a constant thickness h. For this reason, a plurality of irregularities are provided on the surface of the sensor 14. The irregularities include convex portions 14a formed by the X-electrodes 14x, and concave portions 14b between the convex portions 14a where the X-electrodes 14x are not provided (portions from which the surface of the base material 14A is exposed).

Therefore, when the bonding face 13b on the lower side of the bonded sheet 13 and the surface of the sensor 14 are simply fixed with the double-sided adhesive tape 13B disposed therebetween, as described above, the contact area is small, and there is a high possibility that fixing may be unstable.

Accordingly, in this embodiment, a repair material 18 formed of an insulating ink material is applied on the surface of the sensor 14, for example, by silk screen printing. The repair material 18 is laid on the surface of the sensor 14 with a mask having a predetermined shape, and is spread flat by a squeeze so as to fill the concave portions 14b. This reduces height differences between the convex and concave portions, flattens the upper surface of the sensor 14, and thereby increases the contact area.

By thus repairing the upper surface of the sensor 14 so as to increase the contact area and placing the bonded sheet 13 having the double-sided adhesive tapes 13A and 13B on the repaired surface of the sensor 14, the mechanical bonding strength between the lower bonding face 13b of the bonded sheet 13 and the upper surface of the sensor 14 can be increased. In this embodiment, the light guide member 12 and the upper surface of the sensor 14 are firmly fixed by the bonded sheet 13 having the double-sided adhesive tapes 13A and 13B in this way.

As shown in FIG. 2, a space (gap) S is provided between each optical region 12B2 of the light guide member 12 and the sensor 14 by the vertical arrangement of triangular clearances formed by the prism face P, the opening 13A1 of the double-sided adhesive tape 13A, the aperture 13a of the bonded sheet 13, and the opening 13B1 of the double-sided adhesive tape 13B. The sensor 14 has a plurality of through holes 19 extending in the thickness direction through the base material 14A and a part of the repair material 18. A leading end (open end) of each through hole 19 faces the space S. For this reason, air can freely flow between the space S on the lower side of the optical region 12B2 and the outside of the sensor 14 through the through hole 19. Therefore, even when the temperature changes and air enclosed in the space S expands or contracts, the change in air pressure in the space S can be reduced. Consequently, stress caused by the change in air pressure between the light guide member 12 and the sensor 14 can be reduced, and deterioration due to the stress can be prevented.

As described, the marks 12a can be clearly displayed on the operation surface 11A by lighting the LEDs 15 in the input device 10 having the front light mechanism.

Accordingly, the operator can perform a correct input operation by directly pressing the respective marks 12a clearly displayed on the operation surface 11A with the finger. The sensor 14 detects a signal relating to ON/OFF of the pressed mark 12a on the basis of the change in electrostatic capacity, and transmits the signal to the PC body 2. In response to the signal from the sensor 14, the PC body 2 detects that the operation surface 11A has been pressed (ON or OFF) and specifies the pressed mark 12a on the operation surface 11A (a switch input mode). This allows input of the character or sign displayed as the mark 12a.

When the operator slides the finger on the operation surface 11A of the top sheet 11, the input device 10 sequentially samples the coordinate values of the operator's finger (pointing member) on the operation surface 11A from the changes in electrostatic capacity, and transmits the values to the PC body 2. Therefore, a cursor (or a pointer) displayed on the screen of the PC body 2 can be freely moved, as designated by the fingertip of the operator (a coordinate input mode). In the coordinate input mode, various operations, for example, selection and movement of the object displayed on the screen, can be performed by tapping the operation surface 11A with the finger, in a manner similar to clicking of the left button of the mouse. By tapping the operation surface 11A twice, for example, an application can be started, in a manner similar to double-clicking of the mouse. Further, by putting the cursor on an icon on the screen and then tapping and moving the cursor, the icon can be moved to another position on the screen (sliding, dragging).

In the coordinate input mode, the screen can be scrolled in the up-down direction or the right-left direction by sliding the finger on a scroll-bar region provided on the operation surface 11A (scrolling).

A description will now be given of an internal configuration of a terminal apparatus in which the input device 10 shown in FIG. 1 is mounted.

Figure 5:
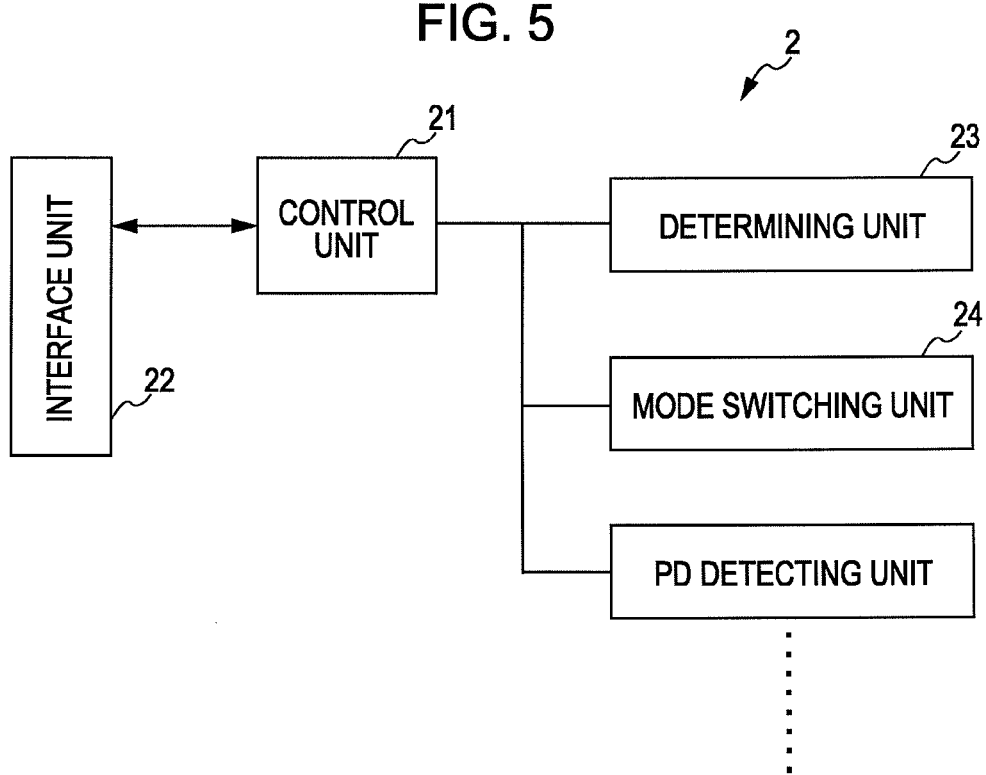
FIG. 5 is a schematic view showing an internal configuration of a PC body in which the input device is mounted.

FIG. 5 is a schematic view showing an internal configuration of a PC body 2 in which the input device 10 is mounted. The PC body 2 includes a control unit 21 that controls the entirety of the PC body 2, an interface unit 22 serving as a communication port that performs communication with the component units, a determining unit 23 that determines an input to the input device 10, and a mode switching unit 24 that switches an operation mode of the input device 10 between a switch input mode and a coordinate input mode.

The PC body 2 has all functions of normal computers. For example, in addition to the above-described units, the PC body 2 includes a PD detecting unit that detects whether a pointing device (PD), such as a mouse, is attached to the PC body 2, a communication control unit that controls a network computing system and electronic mails, an alert control unit that controls various alarms in the PC body 2, and a power control unit that monitors the ON/OFF state of the power supply and the charging state of the battery.

In response to a control signal from the sensor 14, the determining unit 23 determines, according to a predetermined standard, whether an operation performed on the operation surface 11A is a coordinate input operation or a switch input operation. When the determining unit 23 determines that a coordinate input operation is performed, it further determines which of scrolling, tapping, and simple sliding operations is performed.

On the basis of the determination by the determining unit 23, the mode switching unit 24 exerts control to switch the operating state of the input device 10 to a coordinate input mode or a switch input mode. While a coordinate input mode is normally set by default in the mode switching unit 24, a switch input mode can be set by default.

Figure 6:
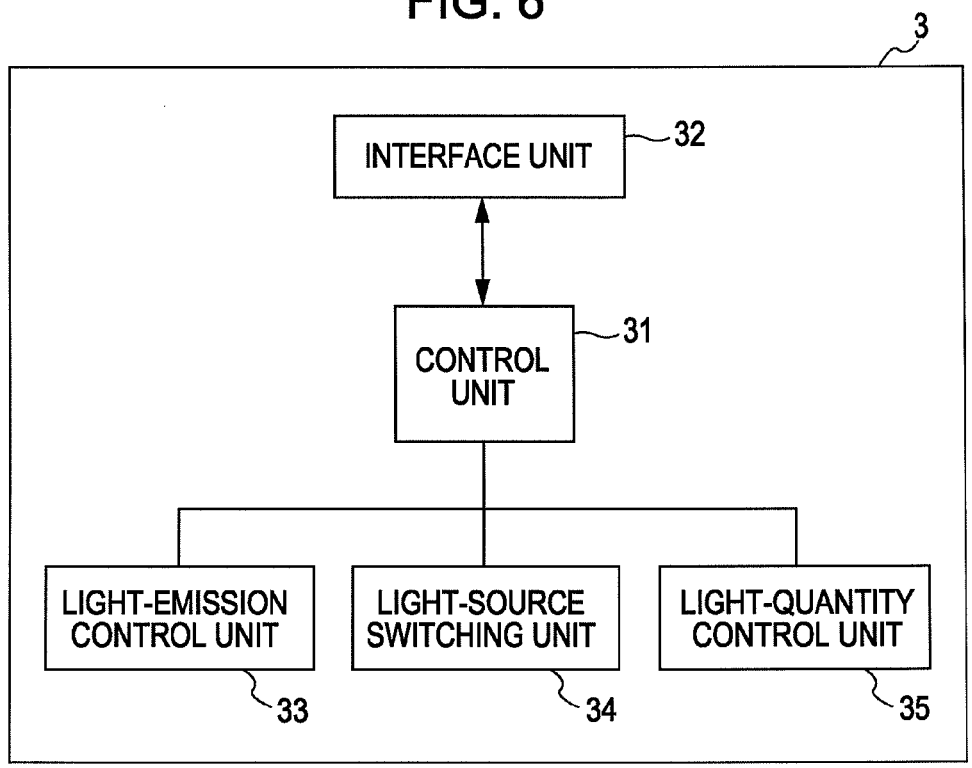
FIG. 6 is a conceptual view showing an internal configuration of a controller provided in the PC body.

FIG. 6 is a conceptual view showing an internal configuration of a controller 3 provided in the PC body 2 shown in FIG. 5.

As shown in FIG. 6, the controller 3 includes a control unit 31 that controls the entire apparatus 2, an interface unit 32 serving as a communication port that performs communication with the component units, a light-emission control unit 33 that controls the ON/OFF states of a plurality of LEDs 15, a light-source switching unit 34 that switches among the LEDs 15, and a light-quantity control unit 35 that changes the brightness of the LEDs 15.

The light-emission control unit 33, the light-source switching unit 34, and the light-quantity control unit 35 are control means that control the LEDs 15 serving as light sources on the basis of the function of the PC body 2 or the sensor 14. The light-emission control unit 33 turns each LED 15 on and off or blinks the LED 15 according to the output from the sensor 14 or application software executed in the PC body 2.

The light-source switching unit 34 switches among a plurality of LEDs 15 under the control of the mode switching unit 24 in the PC body 2. The light-quantity control unit 35 changes the brightness of the LEDs 15 according to the output from the sensor 14 or application software executed in the PC body 2. The light-emission control unit 33, the light-source switching unit 34, and the light-quantity control unit 35 may independently control the LEDs 15, or may be combined into a light-source control unit that controls light emission, switching of the light source, and adjustment of the light quantity.

Figure 7:
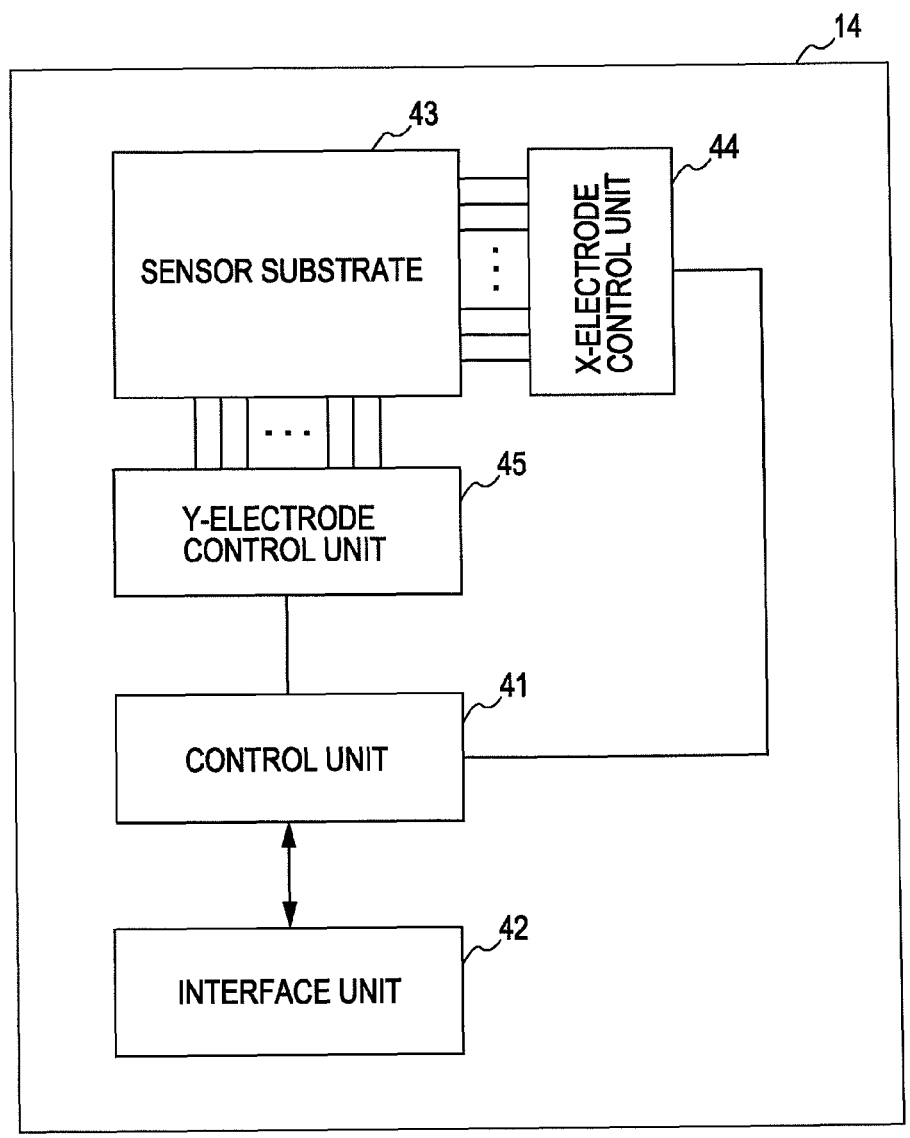
FIG. 7 is a conceptual view showing an internal configuration of the sensor provided in the input device.

FIG. 7 is a conceptual view showing an internal configuration of the sensor 14 provided in the input device 10.

As shown in FIG. 7, the sensor 14 includes a control unit 41 that controls the entire sensor 14, an interface unit 42 serving as a communication port that performs communication with the component units, an X-electrode control unit 44 that controls the X-electrodes 14x, and a Y-electrode control unit 45 that controls the Y-electrodes 14y.

The X-electrode control unit 44 is a circuit that scans the sensor 14 in the X-direction, and the Y-electrode control unit 45 is a circuit that scans the sensor 14 in the Y-direction. Each of the X-electrode control unit 44 and the Y-electrode control unit 45 detects the scanning state of the operator's finger (pointing member), and outputs the detection result as a serial detection signal. The serial detection signal includes a tap component produced when the operation surface 11A of the input device 10 is tapped with the finger, and a slide component produced when the finger is slid on the operation surface 11A. Further, the tap component includes an address component that indicates the position on the operation surface 11A touched by the finger. The slide component includes an address component that indicates the position on the operation surface 11A from which the finger starts to slide and the position which the finger reaches.

A description will be given below of the operation of the input device 10 having the above-described configuration.

When a coordinate input mode is initially set in the mode switching unit 24, the control unit 31 of the controller 3 outputs, to the light-emission control unit 33, a control signal to turn off all LEDs 15, or a control signal to turn on only one or some of the LEDs 15. Alternatively, the control unit 31 may output, to the light-emission control unit 31, both a signal to turn on all LEDs 15 and a control signal to reduce the quantities of light emitted from the LEDs 15.

Consequently, the input device 10 is initially set in a state in which all LEDs 15 are not lighted, a state in which only one or some of the LEDs 15 are lighted, or a state in which all LEDs 15 are lighted with a little light quantity.

The state in which all LEDs 15 are not lighted refers to a state in which no mark 12a is displayed on the operation surface 11A in the front light mechanism. The state in which only one or some of the LEDs 15 are lighted refers to a state in which only one or some of the marks 12a provided on the light guide member 12, for example, only marks "7", "0", "+" and "/" (see FIGS. 3A and 3B) at the four corners are illuminated and displayed on the operation surface 11A. The state in which all LEDs 15 are lighted with a little light quantity refers to all marks 12a are palely displayed with a little light quantity on the operation surface 11A. From this display state on the operation surface 11A of the front light mechanism, the operator can visually recognize that the input operation 10 is set in the coordinate input mode.

When a switch input mode is initially set in the mode switching unit 24, the control unit 31 of the controller 3 outputs a control signal to turn on all LEDs 15 to the light-emission control unit 33, and also outputs a control signal to maximize the light quantity to the light-quantity control unit 35, so that all marks 12a are brightly displayed on the operation surface 11A.

From this display state on the operation surface 11A in which all marks 12a are brightly displayed, the operator can visually recognize that the input operation 10 is set in the switch input mode.

When the operation mode of the input device 10 is switched from the coordinate input mode to the switch input mode, or conversely, from the switch input mode to the coordinate input mode, the control unit 31 transmits a control signal to the light-emission control unit 33, the light-source switching unit 34, or the light-quantity control unit 35 so as to switch the operation of the LEDs 15 corresponding to the switched operation mode. That is, when the operation mode is switched to the switch input mode, all marks 12a are brightly displayed on the operation surface 11A.

When the operation mode is switched to the coordinate input mode, none of the marks 12a are displayed on the operation surface 11A, only one or some of the marks 12a are displayed, or all marks 12a are palely illuminated with a little light quantity. For this reason, the operator can visually recognize the present operation mode of the input device 10 from the display state on the operation surface 11A.

When the determining unit 23 determines that any of scrolling, switching, tapping, and sliding operations is performed, the control unit 31 may transmit a predetermined control signal corresponding to the operation to the light-emission control unit 33, the light-source switching unit 34, or the light-quantity control unit 35 so as to switch the operation state of the LEDs 15 and change the display state on the operation surface 11A of the front light mechanism.

In a scrolling operation, a control signal is transmitted to the light-source switching unit 34, the mark 12a to be displayed is switched in the scrolling direction by regular time intervals, for example, in the order, "7" is on (other marks are off)—"8" is on ("7" is off)—"9" is on ("8" is off)—"/" is on ("9" is off)—"7" is on ("/" is off)— "8" is on ("7" is off). In a tapping or sliding operation, any group of marks 12a, for example, the marks 12a corresponding to "7", "0", "+" and "/" provided at the four corners are blinked at regular time intervals.

In this way, in the input device 10 of this embodiment of the present invention, the display on the operation surface 11A of the front light mechanism can be directed with illumination in accordance with the operation mode. This allows the operator to visually recognize the operation mode of the input device 10. Further, a decorative value can be added to the input device 10.

The functions of the PC body 2 or the sensor 14 are not limited to the above. The present invention is also applicable to a case in which the operation surface 11A is illuminated in relation with the function that can be served by the PC body 2 or the sensor 14.

The present invention is not limited to the above embodiment, and various modifications are possible without departing from the scope of the invention. For example, while the LEDs 15 are adopted as light sources in the above-described embodiment, other members may be used.

While the sensor 14 is of an electrostatic capacitive type in the above-described embodiment, it is not limited thereto. For example, the sensor 14 may be of a pressure-sensitive type.

While deterioration caused by stress due to a change in air pressure is prevented by the through holes 19 in the above-described embodiment, the present invention is not limited thereto. For example, grooves may be formed on the base material 14A so as to connect the space S and the widthwise ends of the base material 14A. Since air can flow through the grooves between the space S and the outside of the sensor 14 even in this structure, deterioration caused by stress due to a change in air pressure is prevented similarly to the above.

What is claimed is:

1. An input device comprising:
   a sensor configured to detect an input operation performed on an operation surface;
   a front light mechanism disposed on the sensor and configured to illuminate the operation surface;
   a mode switching unit configured to select a predetermined operation mode in accordance with the input operation on the operation surface; and
   a control unit configured to switch an illuminating operation of the front light mechanism under the control of the mode switching unit,
   wherein the front light mechanism comprises a light source and a light guide member configured to admit and guide light emitted from the light source therein and to output the light toward the operation surface,
   wherein the light guide member comprises: an illuminating surface disposed on one surface and configured to emit the light therefrom; and an optical region disposed on the other surface opposite the illuminating surface and configured to direct the light toward the illuminating surface,
   wherein the optical region includes a flat face and a prism face, and one of the flat face and the prism face is shaped like a predetermined mark, and
   wherein a sheet member is disposed between the light guide member and the sensor, an aperture is disposed in the sheet member at a position opposite to the prism face to form a space at the prism face.

2. An input device comprising:
   a sensor configured to detect an input operation performed on an operation surface; and
   a front light mechanism disposed on the sensor and configured to illuminate the operation surface,
   wherein a predetermined mark is optically displayed on the operation surface,
   wherein the front light mechanism comprises a light source and a light guide member configured to admit and guide light emitted from the light source therein and to output the light toward the operation surface,
   wherein the light guide member comprises: an illuminating surface disposed on one surface and configured to emit the light therefrom; and an optical region disposed on the other surface opposite the illuminating surface and configured to direct the light toward the illuminating surface,
   wherein the optical region includes a flat face and a prism face, and one of the flat face and the prism face is shaped like a predetermined mark, and
   wherein a sheet member is disposed between the light guide member and the sensor, an aperture is disposed in the sheet member at a position opposite to the prism face to form a space at the prism face.

3. The input device according to claim 1, further comprising:
   a bonded sheet having an aperture opposing the optical region; and
   a double-sided adhesive tape disposed on each surface of the bonded sheet and having an opening similar to the aperture,
   wherein the light guide member and the sensor are joined with the bonded sheet and the double-sided adhesive tapes.

4. The input device according to claim 1, wherein the sensor has a plurality of electrodes on a surface thereof, and a space between the adjacent electrodes is filled with a repairing material.

5. The input device according to claim 3, wherein a space is provided at a position where the prism face of the optical region opposes the aperture of the bonded sheet, and the sensor has a through hole or a groove extending from the outside to the space.

6. The input device according to claim 1, further comprising:
   a top sheet having a light-diffusing function and provided in the uppermost layer of the front light mechanism, the top sheet having a surface serving as the operation surface.

7. The input device according to claim 1, wherein the light source faces a side face of the light guide member.

8. The input device according to claim 7, wherein a portion in which the light source faces the side face of the light guide member is covered with a case, and a mirror finished surface is provided on an inner side of the case.

9. The input device according to claim 1, wherein the light source includes a plurality of light sources, and the number of light sources to be lighted or the quantity of light emitted from the light sources is adjusted by the control unit.

10. The input device according to claim 9, wherein the control unit adjusts the number of light sources or the light quantity in accordance with the selected operation mode.

11. The input device according to claim 4, wherein the repairing material and the adjacent electrodes have same profile height, wherein a double-sided adhesive tape is bonded to both the repairing material and the adjacent electrodes.

* * * * *